(12) United States Patent
Yamamoto (10) Patent No.: US 11,912,113 B2
(45) Date of Patent: Feb. 27, 2024

(54) VEHICLE DOOR ASSEMBLY AND VEHICLE

(71) Applicant: KAWASAKI MOTORS, LTD., Hyogo (JP)

(72) Inventor: Teruaki Yamamoto, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 17/731,126

(22) Filed: Apr. 27, 2022

(65) Prior Publication Data

US 2023/0347722 A1     Nov. 2, 2023

(51) Int. Cl.
*B60J 5/04*     (2006.01)

(52) U.S. Cl.
CPC .................................. *B60J 5/0472* (2013.01)

(58) Field of Classification Search
None
See application file for complete search history.

(56) References Cited

U.S. PATENT DOCUMENTS

| 8,720,977 | B2 * | 5/2014 | Nakamura | B60J 5/0415 |
| | | | | 49/502 |
| 9,963,924 | B2 * | 5/2018 | Moriyama | B60J 5/047 |
| 10,619,391 | B2 * | 4/2020 | Yoo | E05D 7/121 |
| 2014/0217774 | A1 | 8/2014 | Peterson et al. | |

FOREIGN PATENT DOCUMENTS

DE     4227411 A1 *    2/1994   ............ B60J 5/0473

* cited by examiner

*Primary Examiner* — Joseph D. Pape
(74) *Attorney, Agent, or Firm* — Studebaker & Brackett PC (57) ABSTRACT

A door assembly includes a door that turns between a fully-closed position and a fully-open position to open or close a door opening, and hinges that support a front edge portion of the door and are provided such that the trajectory of the center of gravity of the door when the door turns from the fully-closed position to the fully-open position is curved upwardly in an up-down direction and the highest point of the trajectory is positioned between both ends of the trajectory.

4 Claims, 5 Drawing Sheets

VEHICLE DOOR ASSEMBLY AND VEHICLE

FIELD

The technique disclosed herein relates to a vehicle door assembly and a vehicle.

BACKGROUND

Typically, a vehicle has been provided with doors that turn in a front-rear direction to open or close a vehicle compartment. For example, in a vehicle disclosed in U.S. Patent Application Publication No. 2014/0217774, two hinges are provided on a vehicle front side at a door, and the door turns about a hinge axis extending in a vehicle up-down direction.

SUMMARY

The above-described vehicle still has room for improvement in operability in opening or closing of the door. For example, there has been a demand for closing the door with as little force as possible when the door is in the vicinity of a fully-closed position. There has also been a demand for easily maintaining the door in a fully-open state even if, e.g., a wind blows upon loading or unloading of luggage, for example.

The technique disclosed herein has been made in view of the above-described points, and an object thereof is to improve the operability in opening or closing of the door.

A vehicle door assembly disclosed herein includes a door that turns between a fully-closed position and a fully-open position to open or close a door opening, and a hinge that supports a front or rear edge portion of the door and is provided such that the trajectory of the center of gravity of the door when the door turns from the fully-closed position to the fully-open position is curved upwardly in a vehicle up-down direction and the highest point of the trajectory is positioned between both ends of the trajectory.

A vehicle disclosed herein includes a pair of front wheels and a pair of rear wheels, a vehicle body having a pillar forming part of an edge portion of a door opening, and a door assembly provided at the door opening. The door assembly includes a door that turns between a fully-closed position and a fully-open position to open or close the door opening, and a hinge that supports a front or rear edge portion of the door and is provided such that the trajectory of the center of gravity of the door when the door turns from the fully-closed position to the fully-open position is curved upwardly in a vehicle up-down direction and the highest point of the trajectory is positioned between both ends of the trajectory.

DESCRIPTION OF EMBODIMENTS

Hereinafter, an exemplary embodiment will be described in detail based on the drawings.

Figure 1:
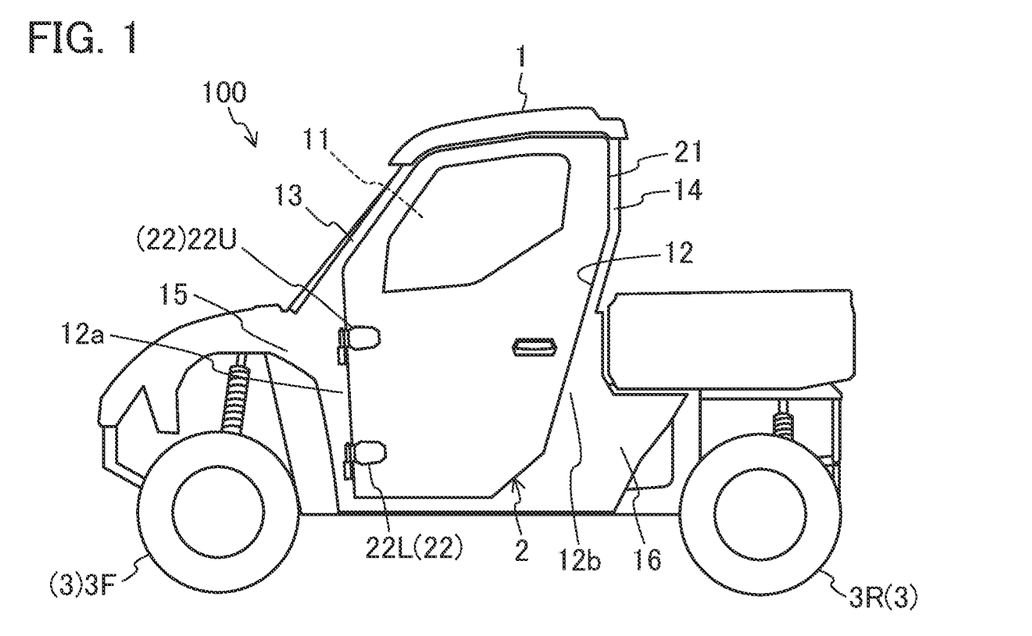
FIG. 1 is a left side view showing an outline configuration of a utility vehicle.

FIG. 1 is a left side view showing an outline configuration of a utility vehicle 100. The utility vehicle 100 is an automobile that can travel off road. The utility vehicle 100 is one example of a vehicle. The utility vehicle 100 includes a vehicle body 1, door assemblies 2, and wheels 3.

Hereinafter, a front-rear direction will be set such that front and rear sides of the utility vehicle 100 in a traveling direction thereof is "front" and "rear," a right-left direction will be set such that right and left sides when facing the front side of the utility vehicle 100 in the traveling direction thereof are "right" and "left," and a height direction of the utility vehicle 100 will be set as an up-down direction. Moreover, the right-left direction is the same as a vehicle width direction which is a width direction of the utility vehicle 100, and for the sake of convenience in description, a vehicle compartment side in the vehicle width direction will be sometimes referred to as an "inner side in the vehicle width direction" and a vehicle outer side in the vehicle width direction will be sometimes referred to as an "outer side in the vehicle width direction."

In the vehicle body 1, a vehicle compartment 11 in which a driver seat and a passenger seat are provided is defined and formed. A door opening 12 causing the vehicle compartment 11 and the outside of the vehicle to communicate with each other is formed at a side portion of the vehicle body 1, i.e., a side portion of the utility vehicle 100. Although not shown in the figure in this example, the door openings 12 are formed at both right and left side portions of the vehicle body 1.

The vehicle body 1 has front pillars 13 and rear pillars 14. The front pillar 13 and the rear pillar 14 form part of an edge portion of the door opening 12. The vehicle body 1 has front fenders 15 each positioned below the front pillars 13 and rear fenders 16 each positioned below the rear pillars 14. The front fender 15 is a portion surrounding the wheel 3, specifically a front wheel 3F. The rear fender 16 is a portion surrounding the wheel 3, specifically a rear wheel 3R.

The plurality of wheels 3 is provided, and supports the vehicle body 1. In this example, four wheels 3 are provided. That is, the wheels 3 include a pair of front wheels 3F and a pair of rear wheels 3R.

Figure 2:
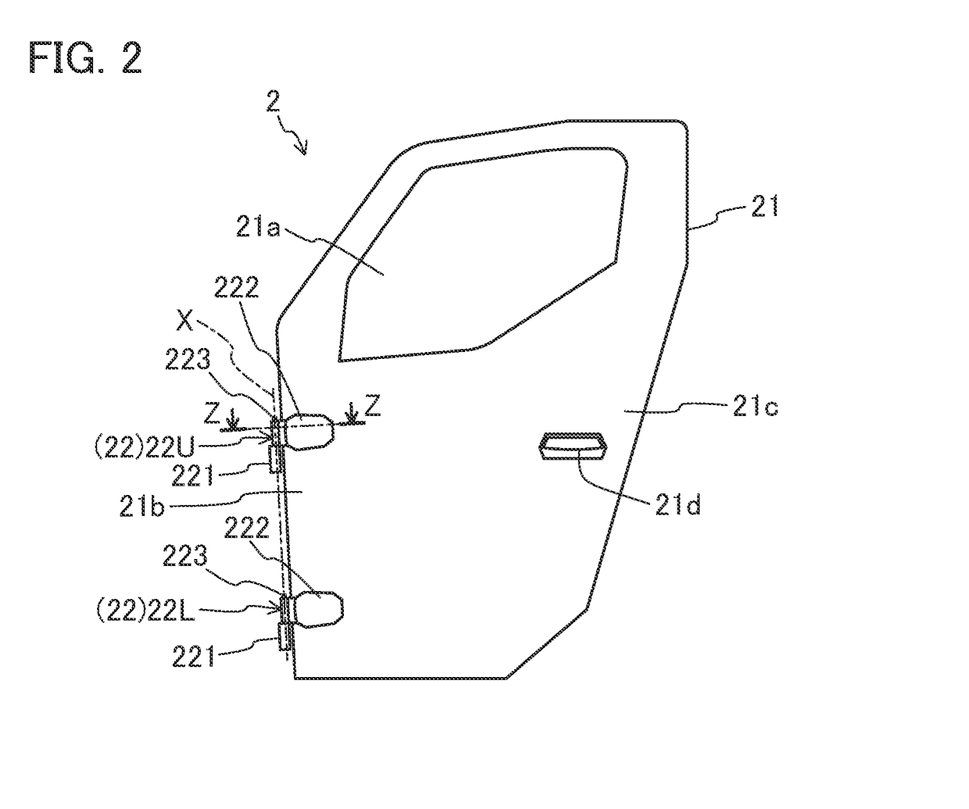
FIG. 2 is a left side view showing an outline configuration of a door assembly.

FIG. 2 is a left side view showing an outline configuration of the door assembly 2. The door assembly 2 is for opening or closing the door opening 12. In this example, two door assemblies 2 for the door opening 12 at the left side portion and the door opening 12 at the right side portion are provided. The door assembly 2 includes a door 21 and hinges 22.

The hinge 22 is part of an element that fixes an edge portion of the door 21 so as to open or close the door 21. That is, the hinge 22 turnably supports the door 21. In this example, two hinges 22 are provided to support a front edge portion 21*b* of the door 21. Two hinges 22 are spaced from each other in the up-down direction at the vehicle body 1. Hereinafter, when two hinges 22 are distinguished from each other in description, these hinges 22 will be referred to as an upper hinge 22U and a lower hinge 22L. The upper hinge 22U and the lower hinge 22L have the same configuration.

Two hinges 22 are provided over the vehicle body 1 and the door 21. Specifically, two hinges 22 are provided over a front edge portion 12*a* of the door opening 12 and the front edge portion 21*b* of the door 21. At the vehicle body 1, a region between the front pillar 13 and the front fender 15 forms the front edge portion 12*a* of the door opening 12. Each of two hinges 22 has a first member 221 to be attached to the vehicle body 1, a second member 222 to be attached to the door 21, and a shaft 223.

Figure 3:
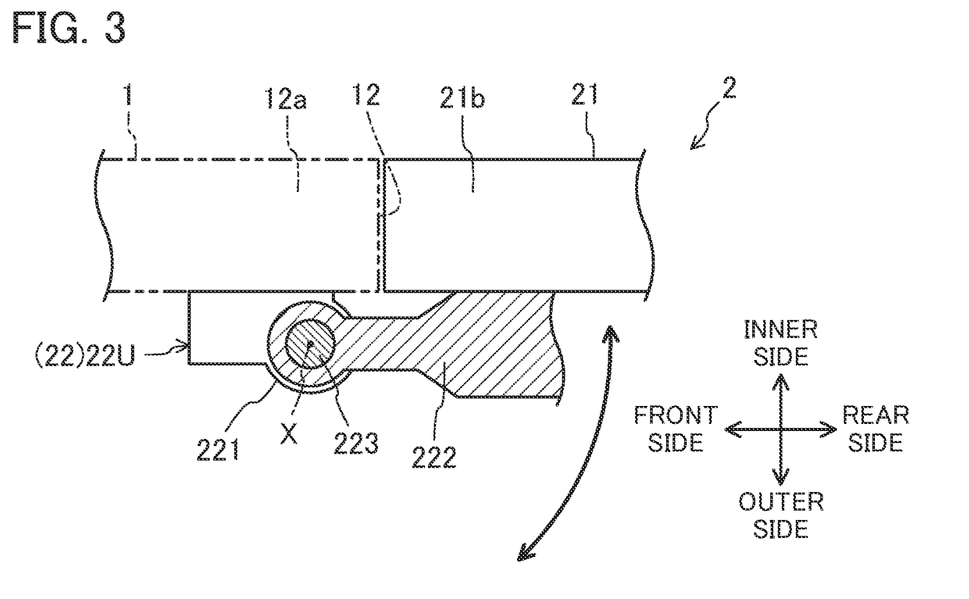
FIG. 3 is a sectional view along a Z-Z line shown in FIG. 2.

FIG. 3 is a sectional view along a Z-Z line shown in FIG. 2. In FIG. 3, the inner side and the outer side in the vehicle width direction are merely shown as an inner side and an outer side, and the same also applies to FIGS. 5 to 10 described later. The first member 221 is attached to the vehicle body 1, more specifically the front edge portion 12*a* of the door opening 12. The second member 222 is attached to the door 21, more specifically the front edge portion 21*b* of the door 21.

The shaft 223 is attached to the first member 221. The second member 222 is fitted onto an outer peripheral side of the shaft 223, and is provided so as to turn about the shaft 223. That is, the center of the shaft 223 is a turning axis X of the second member 222 of the hinge 22. More specifically, the second member 222 is turnable on the shaft 223. The shaft 223 is provided in a state in which the shaft 223 extends substantially in the up-down direction. The shaft 223 is, for example, a rod-shaped member having a circular sectional shape. Note that the second member 222 may be configured to turn together with the shaft 223. Note that the shafts 223 of two hinges 22 are provided coaxially with each other. That is, the turning axis X of the upper hinge 22U and the turning axis X of the lower hinge 22L are the same axis.

The door 21 turns in the front-rear direction about the shafts 223, i.e., the turning axis X, thereby opening or closing the door opening 12. The door 21 is formed with such shape and size that the door opening 12 is closed with the door 21. As described above, the second members 222 of two hinges 22 are attached to the front edge portion 21*b* of the door 21. With this configuration, the door 21 is supported by two hinges 22, and is turnable in the front-rear direction about the turning axis X. That is, the door 21 turns relative to the shafts 223 together with the second members 222. The door 21 is provided with a window 21*a*. More specifically, the window 21*a* is provided in a substantially upper half region of the door 21. Moreover, the door 21 is provided with a door knob 21*d* on the side closer to a rear edge portion 21*c* of the door 21.

Specifically, the door 21 turns in the front-rear direction from a fully-closed position to a fully-open position, thereby opening or closing the door opening 12. As shown in FIG. 1, the fully-closed position is the position of the door 21 when the door 21 fully closes the door opening 12. The fully-open position is the position of the door 21 after the door 21 has turned to a predetermined limit angle from the fully-closed position. That is, the door 21 does not open to an angle exceeding the predetermined limit angle. Hereinafter, the predetermined limit angle will be referred to as a fully-open angle.

Figure 4:
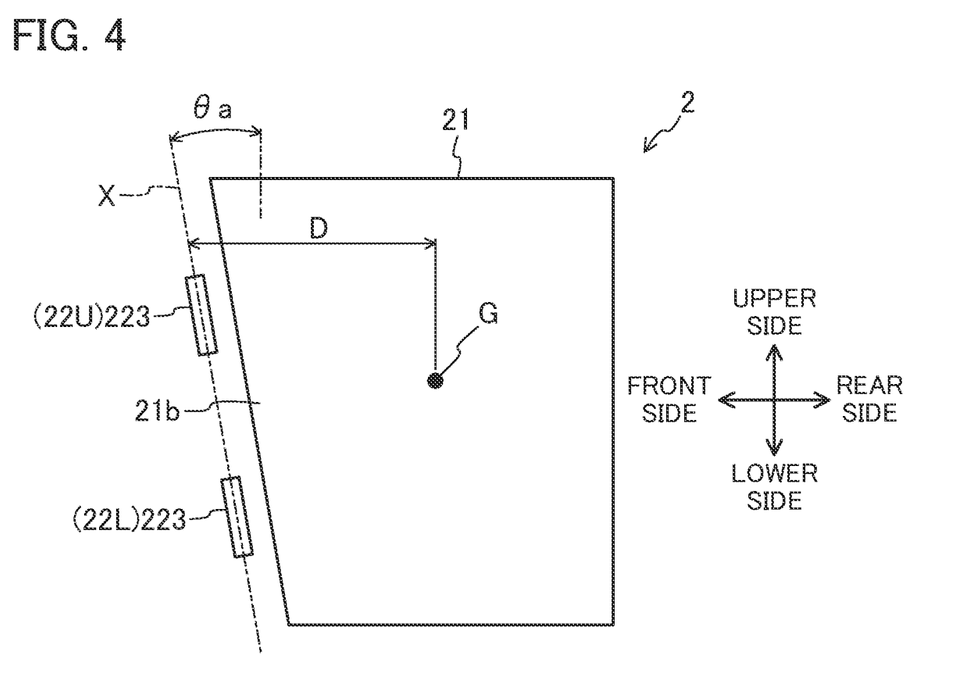
FIG. 4 is a schematic view showing a relationship between a door and a turning axis of hinges from the left side of the utility vehicle.
Figure 5:
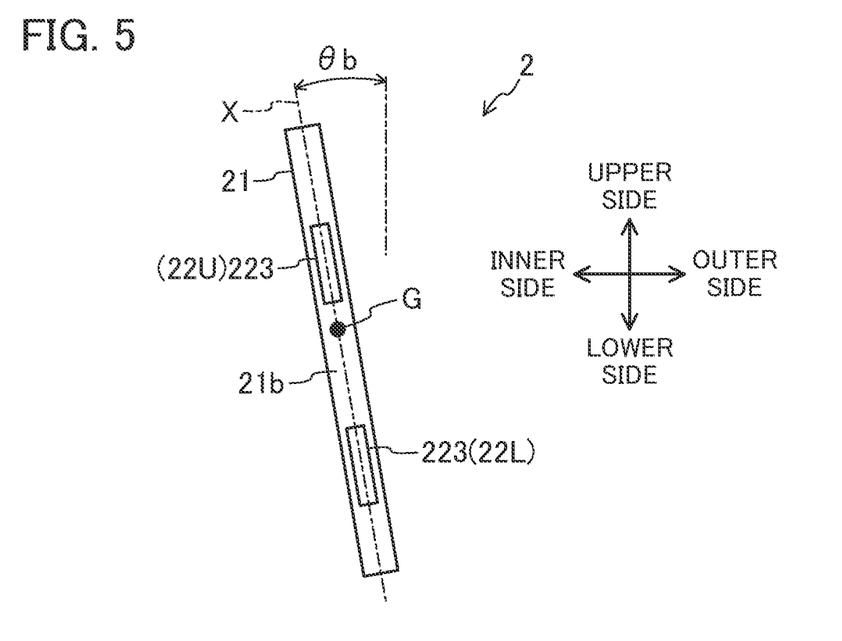
FIG. 5 is a schematic view showing the relationship between the door and the turning axis of the hinges from the front of the utility vehicle.

FIG. 4 is a schematic view showing a relationship between the door 21 and the turning axis X of the hinges 22 from the left side of the utility vehicle 100. FIG. 5 is a schematic view showing the relationship between the door 21 and the turning axis X of the hinges 22 from the front of the utility vehicle 100. Note that FIGS. 4 and 5 show the door assembly 2 provided at the left side portion of the utility vehicle 100 and the same also applies to FIGS. 6 and 7 described later.

Two hinges 22 are provided such that the trajectory of the center of gravity of the door when the door 21 turns from the fully-closed position to the fully-open position is curved upwardly in the up-down direction and the highest point of the trajectory is positioned between both ends of the trajectory.

Specifically, as shown in FIG. 4, the turning axis X of two hinges 22 is inclined in the front-rear direction, and a distance D between the turning axis X and the center G of gravity of the door 21 in the front-rear direction increases as the turning axis X extends upwardly. More specifically, the turning axis X is inclined forward in the front-rear direction with respect to the up-down direction by a predetermined inclination angle θa. That is, an upper portion of each of two shafts 223 is positioned on the front side in the front-rear direction with respect to a lower portion of such a shaft 223. At two shafts 223, the shaft 223 of the upper hinge 22U is positioned on the front side in the front-rear direction with respect to the shaft 223 of the lower hinge 22L. In other words, the upper hinge 22U is positioned on the front side in the front-rear direction with respect to the lower hinge 22L. In still other words, the lower hinge 22L is positioned on the rear side in the front-rear direction with respect to the upper hinge 22U.

Since the turning axis X is inclined forward in the front-rear direction with respect to the up-down direction as described above, the lower hinge 22L is positioned on the rear side in the front-rear direction with respect to the upper hinge 22U. Thus, two hinges 22 can be positioned closer to the front pillar 13 and the front fender 15 without contacting the front wheel 3F, as shown in FIG. 1. With this configuration, a region surrounded by the hinges 22, the front pillar 13, and the front fender 15 is smaller, and therefore, the blind area of a driver is reduced. As the inclination angle θa of the turning axis X increases, two hinges 22 approach the front pillar 13 etc. without contacting the front wheel 3F.

As shown in FIG. 5, the turning axis X of two hinges 22 is inclined in the vehicle width direction, and displaces inwardly in the vehicle width direction as extending upwardly. More specifically, the turning axis X is inclined inwardly in the vehicle width direction with respect to the up-down direction by a predetermined inclination angle θb. That is, the upper portion of each of two shafts 223 is positioned on the inner side in the vehicle width direction with respect to the lower portion of such a shaft 223. At two shafts 223, the shaft 223 of the upper hinge 22U is positioned on the inner side in the vehicle width direction with respect to the shaft 223 of the lower hinge 22L.

Figure 6:
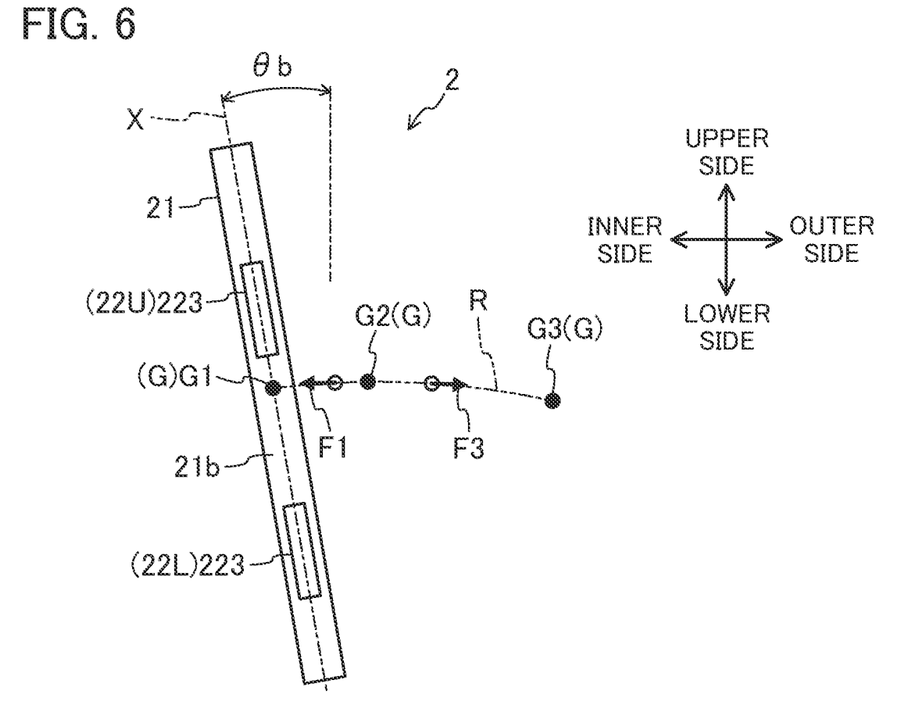
FIG. 6 is a schematic view showing the trajectory of the center of gravity of the door from the front of the utility vehicle.
Figure 7:
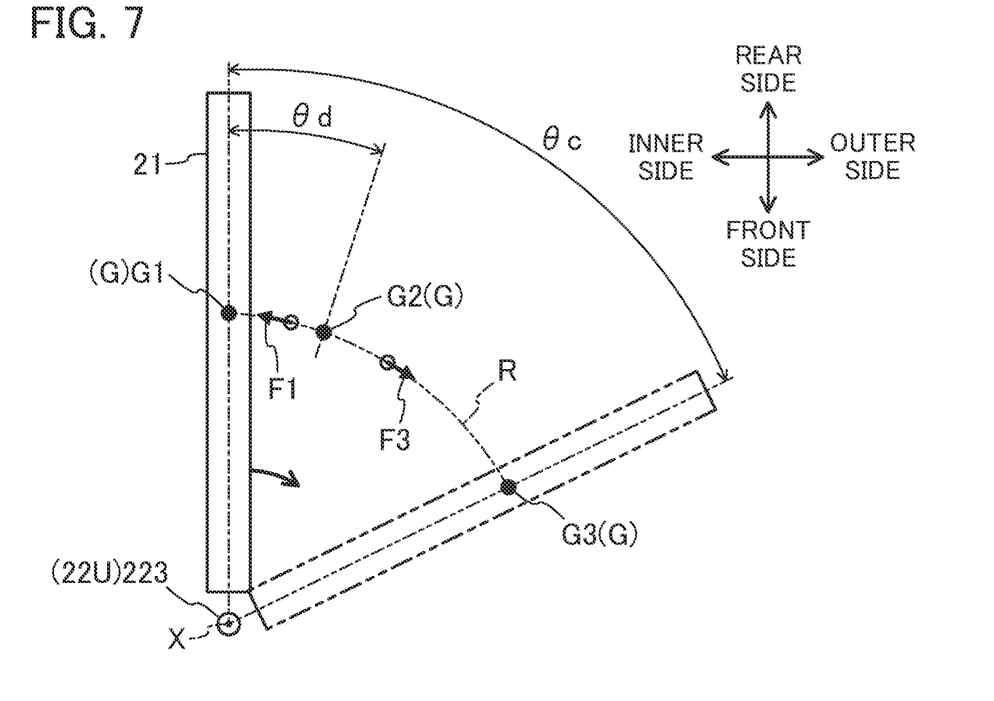
FIG. 7 is a schematic view showing the trajectory of the center of gravity of the door from above the utility vehicle.

FIG. 6 is a schematic view showing the trajectory R of the center G of gravity of the door 21 from the front of the utility vehicle 100. FIG. 7 is a schematic view showing the trajectory R of the center G of gravity of the door 21 from above the utility vehicle 100.

Since the turning axis X is inclined inwardly in the vehicle width direction with respect to the up-down direction as described above, the trajectory R of the center G of gravity of the door 21 when the door 21 turns from the fully-closed position to the fully-open position is curved upwardly in the up-down direction, as shown in FIG. 6. On the trajectory R, the center G1 of gravity indicates the position of the center G of gravity when the door 21 is at the fully-closed position, and the center G3 of gravity indicates the position of the center G of gravity when the door 21 is at the fully-open position. That is, the center of gravity moves from the center G1 of gravity to the center G3 of gravity as the door 21 turns from the fully-closed position to the fully-open position.

The highest point of the trajectory R is positioned between both ends of the trajectory R. That is, the highest point is positioned at a location other than the positions of the center G1 of gravity and the center G3 of gravity on the trajectory R. On the trajectory R, the center G2 of gravity indicates the position of the center G of gravity at the highest point. As described above, the height of the center G of gravity on the trajectory R increases as the door 21 turns from the fully-closed position, and after the position of the center G of gravity has passed the highest point, the height of the center G of gravity decreases as the door 21 turns toward the fully-open position.

The inclination of the shafts 223 and the trajectory R of the center G of gravity are set as described above, and accordingly, closing force F1 or opening force F3 acts on the door 21 as shown in FIGS. 6 and 7 according to the position of the door 21 in a turning direction thereof. The closing force F1 is force in the direction of closing the door 21 in the turning direction of the door 21. The opening force F3 is force in the direction of opening the door 21 in the turning direction of the door 21. The closing force F1 and the opening force F3 are force based on the force of gravity on the door 21 itself.

Specifically, when the center G of gravity of the door 21 is positioned between the center G1 of gravity and the center G2 of gravity on the trajectory R, the closing force F1 acts on the door 21. By action of the closing force F1 on the door 21, the door 21 is brought into a so-called automatically-closable state. When the center G of gravity of the door 21 is positioned between the center G2 of gravity and the center G3 of gravity on the trajectory R, the opening force F3 acts on the door 21. By action of the opening force F3 on the door 21, the door 21 is brought into a so-called automatically-openable state. That is, the door 21 is in the automatically-closable state in the vicinity of the fully-closed position, and is in the automatically-openable state in an area from the fully-open position to the vicinity thereof.

Since the door 21 is in the automatically-closable state in the vicinity of the fully-closed position, the door 21 remains in the vicinity of the fully-closed position even when a door latch is unlocked during traveling, for example. This prevents the door 21 from automatically opening upon unlocking of the door latch. Moreover, since the door 21 is in the automatically-openable state in the area from the fully-open position to the vicinity thereof, the door 21 is maintained in a fully-open state even without the need for applying force to the door 21 by a passenger. Thus, loading of luggage on the vehicle compartment 11 and unloading of luggage from the vehicle compartment 11 are facilitated, for example.

As shown in FIG. 7, the highest point of the trajectory R is positioned closer to the fully-closed position with respect to the center of the trajectory R. Specifically, a turning angle θd when the door 21 turns until the center G of gravity reaches the highest point from the fully-closed position is an angle smaller than the half of the fully-open angle θc. That is, on the trajectory R, a region where the door 21 is in the automatically-openable state is larger than a region where the door 21 is in the automatically-closable state.

The percentages of the automatically-closable region and the automatically-openable region on the trajectory R are changeable in such a manner that the inclination angle θa and the inclination angle θb of the turning axis X with respect to the up-down direction are changed. Specifically, as the inclination angle θa of the turning axis X with respect to the up-down direction increases, the percentage of the automatically-openable region increases. As the inclination angle θa decreases, the percentage of the automatically-openable region decreases. That is, the turning angle θd decreases as the inclination angle θa increases, and increases as the inclination angle θa decreases. As the inclination angle θb of the turning axis X with respect to the up-down direction increases, the percentage of the automatically-closable region increases. As the inclination angle θb decreases, the percentage of the automatically-closable region decreases. That is, the turning angle θd increases as the inclination angle θb increases, and decreases as the inclination angle θb decreases.

With a great inclination angle θa, two hinges 22 can be positioned closer to the front pillar 13 and the front fender 15 without contacting the front wheel 3F. Thus, the blind area of the driver is further reduced.

As described above, the door assembly 2 of the utility vehicle 100 includes the door 21 that turns between the fully-closed position and the fully-open position to open or close the door opening 12 and the hinges 22 that support the front edge portion 21b of the door 21 and are provided such that the trajectory R of the center G of gravity of the door 21 when the door 21 turns from the fully-closed position to the fully-open position is curved upwardly in the up-down direction and the highest point of the trajectory R is positioned between both ends of the trajectory R.

The utility vehicle 100 further includes the pair of front wheels 3F, the pair of rear wheels 3R, the vehicle body 1 having the front pillars 13 and the rear pillars 14 forming part of the edge portions of the door openings 12, and the door assemblies 2 each provided at the door openings 12. The door assembly 2 includes the door 21 that turns between the fully-closed position and the fully-open position to open or close the door opening 12 and the hinges 22 that support the front edge portion 21b of the door 21 and are provided such that the trajectory R of the center G of gravity of the door 21 when the door 21 turns from the fully-closed position to the fully-open position is curved upwardly in the up-down direction and the highest point of the trajectory R is positioned between both ends of the trajectory R.

With this configuration, the closing force F1 or the opening force F3 can act on the door 21 according to the position of the door 21 in the turning direction thereof. Specifically, when the center G of gravity of the door 21 is positioned between the fully-closed position and the highest point on the trajectory R, the closing force F1 acts on the door 21. When the center G of gravity of the door 21 is positioned between the highest point and the fully-open position on the trajectory R, the opening force F3 acts on the door 21. By action of the closing force F1 on the door 21, the door 21 is brought into the so-called automatically-closable state. By action of the opening force F3 on the door 21, the door 21 is brought into the so-called automatically-openable state. As described above, the door 21 can be switched between the automatically-closable state and the automatically-openable state between both ends of the trajectory R. Thus, the door 21 can be in the automatically-closable state in the vicinity of the fully-closed position, and is in the automatically-openable state in the area from the fully-open position to the vicinity thereof.

Since the door 21 is in the automatically-closable state in the vicinity of the fully-closed position, the door 21 can be closed with less force. Since the door 21 is in the automatically-openable state in the area from the fully-open state to the vicinity thereof, the door 21 can be maintained in the fully-open state without the need for applying force to the door 21 by the passenger. Thus, loading of luggage on the vehicle compartment 11 and unloading of luggage from the vehicle compartment 11 are facilitated, for example. As described above, operability in opening or closing of the door 21 can be improved.

Since the door 21 is in the automatically-closable state in the vicinity of the fully-closed position, the door 21 can remain in the vicinity of the fully-closed position even when the door latch is unlocked during traveling, for example. This can prevent the door 21 from automatically opening upon unlocking of the door latch.

In the door assembly 2 of the utility vehicle 100, the turning axis X of the hinges 22 upon turning of the door 21 is inclined in the vehicle width direction, and displaces inwardly in the vehicle width direction as extending upwardly.

According to this configuration, by the simple technique of inclining the turning axis X of the hinges 22, i.e., the shafts 223, in a predetermined direction, the trajectory R of the center G of gravity of the door 21 can be curved upwardly in the up-down direction, and the highest point of the trajectory R can be positioned between both ends of the trajectory R.

In the door assembly 2 of the utility vehicle 100, the turning axis X is inclined in the front-rear direction, and the distance D between the turning axis X and the center G of gravity of the door 21 in the front-rear direction increases as the turning axis X extends upwardly.

Since the turning axis X is inclined in the front-rear direction as described above, the lower hinge 22L is, for example, positioned on the rear side in the front-rear direction with respect to the upper hinge 22U. Thus, as shown in FIG. 1, the hinges 22 can be positioned closer to the front pillar 13 and the front fender 15 without contacting the front wheel 3F. With this configuration, the region surrounded by the hinges 22, the front pillar 13, and the front fender 15 is smaller, and therefore, the blind area of the driver is reduced. As described above, the blind area of the driver can be reduced while the operability in opening or closing of the door 21 is improved.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described in the above-described embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

Figure 8:
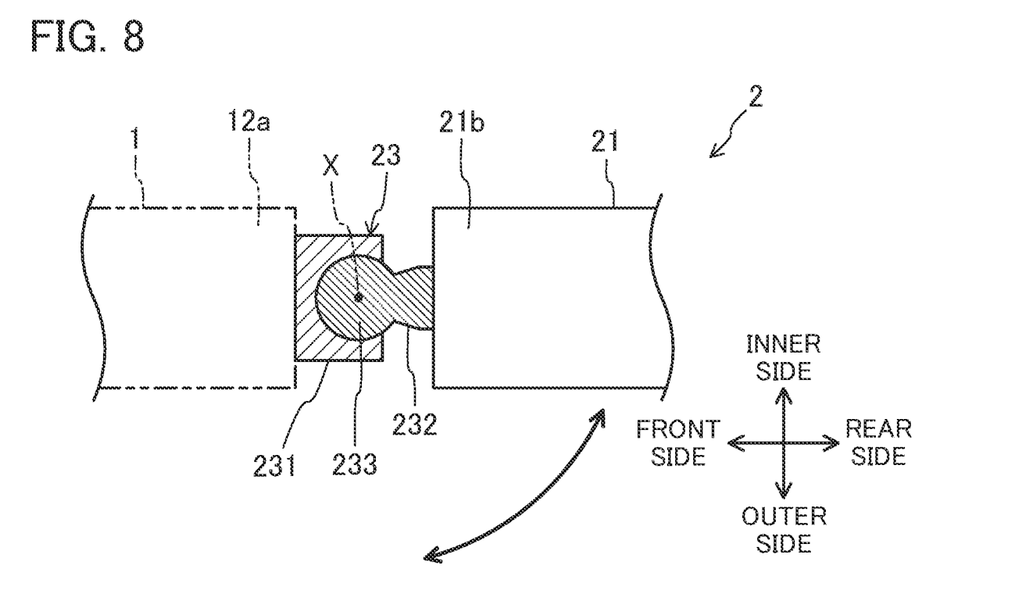
FIG. 8 is a sectional view showing an outline configuration of a hinge according to another embodiment.

The form of the hinge is not limited to above, and may be one shown in FIG. 8, for example. FIG. 8 is a sectional view showing an outline configuration of a hinge 23 according to another embodiment. The hinge 23 of this example is a so-called ball joint. The hinge 23 has a first member 231 to be attached to the front edge portion 12a of the door opening 12 and a second member 232 to be attached to the front edge portion 21b of the door 21. The second member 232 is a ball stud formed with a spherical portion 233 at an end portion. The first member 231 is a socket to be fitted onto the spherical portion 233 of the second member 232. In the hinge 23, the second member 232 is coupled to the first member 231 so as to turn about the spherical portion 233. That is, the center of the spherical portion 233 is the turning axis X of the second member 232. Thus, the door 21 is turnable about the turning axis X as indicated by an arrow in FIG. 8.

Figure 9:
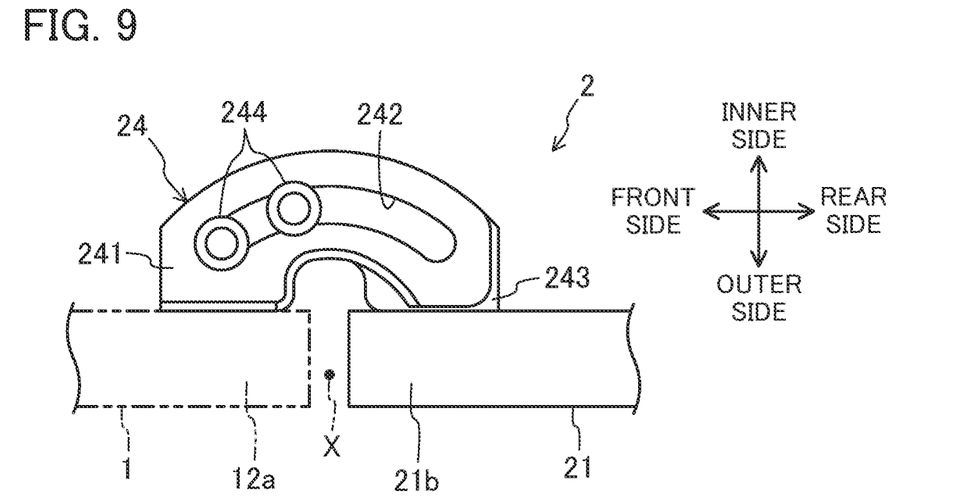
FIG. 9 is a view showing an outline configuration of a hinge according to still another embodiment.
Figure 10:
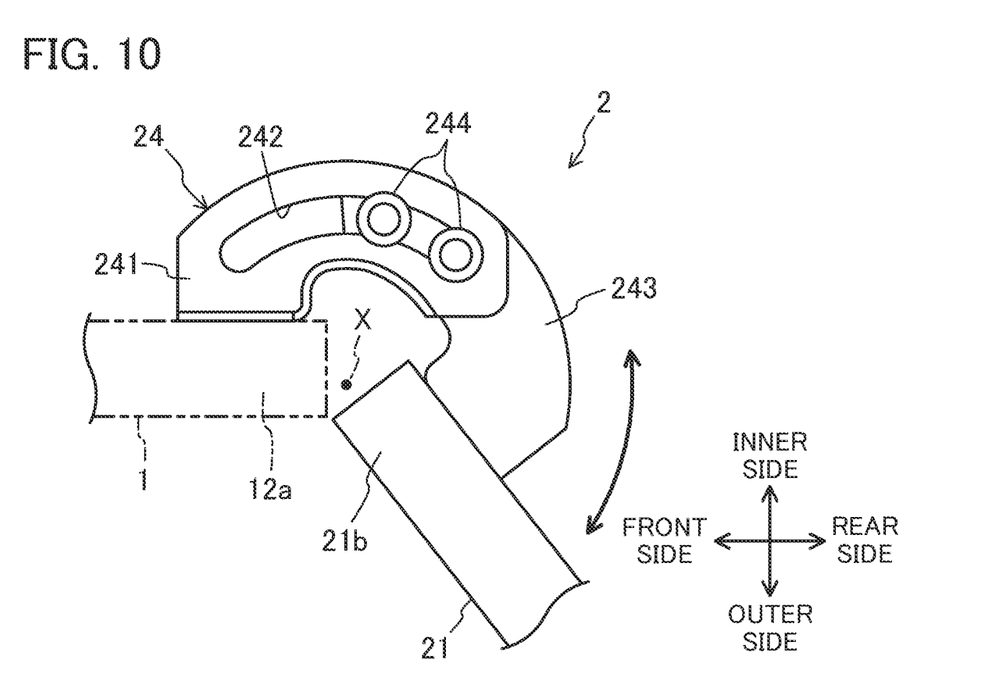
FIG. 10 is a view showing a state after the hinge shown in FIG. 9 has turned.

The hinge may be one shown in FIGS. 9 and 10. FIG. 9 is a view showing an outline configuration of a hinge 24 according to another embodiment. FIG. 10 is a view showing a state after the hinge 24 shown in FIG. 9 has turned. The hinge 24 of this example has a first member 241 to be attached to the front edge portion 12a of the door opening 12 and a second member 243 to be attached to the front edge portion 21b of the door 21. The second member 243 is coupled to the first member 241 so as to turn about the turning axis X. Specifically, the second member 243 is provided with rollers 244. At the first member 241, an arc-shaped guide hole 242 for guiding the rollers 244 is formed. In the hinge 24, the rollers 244 are guided along the guide hole 242 as indicated by an arrow shown in FIG. 10, and accordingly, the second member 243 turns about the turning axis X. Thus, the door 21 is turnable about the turning axis X.

The number of hinges 22 is not limited to two, and may be one or three or more.

The automatically-closable region may be larger than the automatically-openable region on the trajectory R. That is, on the trajectory R, the highest point may be positioned closer to the fully-open position with respect to the center of the trajectory R. Specifically, the turning angle θd of the door 21 may be greater than the half of the fully-open angle θc.

In the above-described embodiment, the form in which the hinges 22 support the front edge portion 21b of the door 21 has been described. However, the technique disclosed herein is also applicable to a form in which the hinges support the rear edge portion 21c of the door 21.

In this case, the hinges are provided over a rear edge portion 12b of the door opening 12 and the rear edge portion 21c of the door 21. That is, the first members are attached to the rear edge portion 12b of the door opening 12, and the second members are attached to the rear edge portion 21c of the door 21. As in the above-described embodiment, the second member turns about the turning axis which is the center of the shaft. The turning axis is inclined rearward in the front-rear direction with respect to the up-down direction by the predetermined inclination angle. That is, the distance between the turning axis and the center G of gravity of the door 21 in the front-rear direction increases as the turning axis extends upwardly. As in the above-described embodiment, the turning axis is inclined inwardly in the vehicle width direction with respect to the up-down direction by the predetermined inclination angle. Thus, the trajectory R of the center G of gravity of the door 21 when the door 21 turns from the fully-closed position to the fully-open position is curved upwardly in the up-down direction, and the highest point of the trajectory R is positioned between both ends of the trajectory R. Consequently, in this configuration, the door is in the automatically-closable state in the vicinity of the fully-closed position and is in the automatically-openable state in the area from the fully-open position to the vicinity thereof, as in the above-described embodiment.

The door 21 may be of a so-called half door type with no window 21a.

The technique disclosed herein may be applied to a vehicle other than the utility vehicle 100.

What is claimed:

1. A vehicle door assembly comprising:
a door that turns between a fully-closed position and a fully-open position to open or close a door opening; and
a hinge that supports a front or rear edge portion of the door and is provided such that a trajectory of a center of gravity of the door when the door turns from the fully-closed position to the fully-open position is curved upwardly in a vehicle up-down direction and a highest point of the trajectory is positioned between both ends of the trajectory, wherein
the highest point of the trajectory is positioned closer to the fully-closed position with respect to a center of the trajectory.

2. The vehicle door assembly of claim 1, wherein
a turning axis of the hinge upon turning of the door is inclined in a vehicle width direction, and displaces inwardly in the vehicle width direction as the turning axis extends upwardly.

3. The vehicle door assembly of claim 1, wherein
a turning axis of the hinge upon turning of the door is inclined in a vehicle front-rear direction, and a distance between the turning axis and the center of gravity of the door in the front-rear direction increases as the turning axis extends upwardly.

4. A vehicle comprising:
a pair of front wheels and a pair of rear wheels;
a vehicle body having a pillar forming part of an edge portion of a door opening; and
a door assembly provided at the door opening,
wherein the door assembly includes
a door that turns between a fully-closed position and a fully-open position to open or close the door opening, and
a hinge that supports a front or rear edge portion of the door and is provided such that a trajectory of a center of gravity of the door when the door turns from the fully-closed position to the fully-open position is curved upwardly in a vehicle up-down direction and a highest point of the trajectory is positioned between both ends of the trajectory, wherein
the highest point of the trajectory is positioned closer to the fully-closed position with respect to a center of the trajectory.

* * * * *